US011036683B2

(12) United States Patent
Jha et al.

(10) Patent No.: US 11,036,683 B2
(45) Date of Patent: Jun. 15, 2021

(54) HOT-PLUGGABLE FILE SYSTEM INTERFACE

(71) Applicant: International Business Machines Corporation, Armonk, NY (US)

(72) Inventors: Deepak Kumar Jha, Bangalore (IN); Karrthik K. G., Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 16/031,971

(22) Filed: Jul. 10, 2018

(65) Prior Publication Data
US 2020/0019621 A1  Jan. 16, 2020

(51) Int. Cl.
*G06F 16/00*  (2019.01)
*G06F 16/17*  (2019.01)
*G06F 16/182*  (2019.01)
*G06F 16/188*  (2019.01)

(52) U.S. Cl.
CPC ........ *G06F 16/1734* (2019.01); *G06F 16/183* (2019.01); *G06F 16/188* (2019.01)

(58) Field of Classification Search
CPC ...... G06F 16/188; G06F 3/067; G06F 16/182; G06F 16/1748
See application file for complete search history.

(56) References Cited

U.S. PATENT DOCUMENTS

| 8,712,982 | B2* | 4/2014 | Holt | H04L 67/06 707/698 |
| 9,984,083 | B1* | 5/2018 | Tiwari | G06F 16/24524 |
| 2006/0041644 | A1* | 2/2006 | Henseler | H04L 67/10 709/220 |
| 2006/0271608 | A1* | 11/2006 | Qi | G06F 3/0605 |
| 2010/0257218 | A1* | 10/2010 | Vassilev | G06F 16/188 707/823 |
| 2018/0048702 | A1* | 2/2018 | Patil | G06F 21/554 |
| 2019/0187907 | A1* | 6/2019 | Mukku | G06F 12/0246 |

FOREIGN PATENT DOCUMENTS

CN  105760467 A  7/2016

OTHER PUBLICATIONS

Volos et al., "Aerie: Flexible File-System Interfaces to Storage-Class Memory," Eurosys, Apr. 2014, 14 pages.
Huang et al., "High-Performance Design of HBase with RDMA over InfiniBand," IEEE 26th International Parallel and Distributed Processing Symposium, 2012, pp. 774-785.
Akhtar et al., "A Perusal of Big Data Classification and Hadoop Technology," International Transaction of Electrical and Computer Engineers System, vol. 4, No. 1, 2017, pp. 26-38.
(Continued)

*Primary Examiner* — Hung Q Pham
(74) *Attorney, Agent, or Firm* — Zilka-Kotab, P.C.

(57) ABSTRACT

A computer-implemented method according to one embodiment includes initiating a file system interface in a kernel space of a system cluster, capturing a data access request sent from a user space of the system cluster, utilizing the file system interface, where the data access request is sent utilizing one or more protocols of a first file system, and redirecting the data access request to a second file system of the system cluster, utilizing the file system interface.

20 Claims, 8 Drawing Sheets

(56) References Cited

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Dec. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
IBM, "HDFS transparency," IBM Knowledge Center, BM Spectrum Scale HDFS Transparency, 2018, 4 pages retrieved from https://www.ibm.com/support/knowledgecenter/en/STXKQY_4.2.0/com.ibm.spectrum.scale.v4r2.adv.doc/bl1adv_Overview.htm.

* cited by examiner

HOT-PLUGGABLE FILE SYSTEM INTERFACE

BACKGROUND

The present invention relates to file systems, and more specifically, this invention relates to enabling multiple file systems within a clustered environment.

Clusters of computing systems (e.g., system clusters) are commonly used to perform duties such as data storage in a data computing environment. However, current attempts to integrate a non-native file system into a clustered environment are labor and resource-intensive, and introduce many performance bottlenecks.

SUMMARY

A computer-implemented method according to one embodiment includes initiating a file system interface in a kernel space of a system cluster, capturing a data access request sent from a user space of the system cluster, utilizing the file system interface, where the data access request is sent utilizing one or more protocols of a first file system, and redirecting the data access request to a second file system of the system cluster, utilizing the file system interface.

According to another embodiment, a computer program product for implementing a hot-pluggable file system interface includes a computer readable storage medium having program instructions embodied therewith, where the computer readable storage medium is not a transitory signal per se, and where the program instructions are executable by a processor to cause the processor to perform a method comprising initiating, by the processor, a file system interface in a kernel space of a system cluster, capturing, by the processor, a data access request sent from a user space of the system cluster, utilizing the file system interface, where the data access request is sent utilizing one or more protocols of a first file system, and redirecting, by the processor, the data access request to a second file system of the system cluster, utilizing the file system interface.

A system according to another embodiment includes a processor, and logic integrated with the processor, executable by the processor, or integrated with and executable by the processor, where the logic is configured to initiate a file system interface in a kernel space of a system cluster, capture a data access request sent from a user space of the system cluster, utilizing the file system interface, where the data access request is sent utilizing one or more protocols of a first file system, and redirect the data access request to a second file system of the system cluster, utilizing the file system interface.

Other aspects and embodiments of the present invention will become apparent from the following detailed description, which, when taken in conjunction with the drawings, illustrate by way of example the principles of the invention.

DETAILED DESCRIPTION

Figure 1:
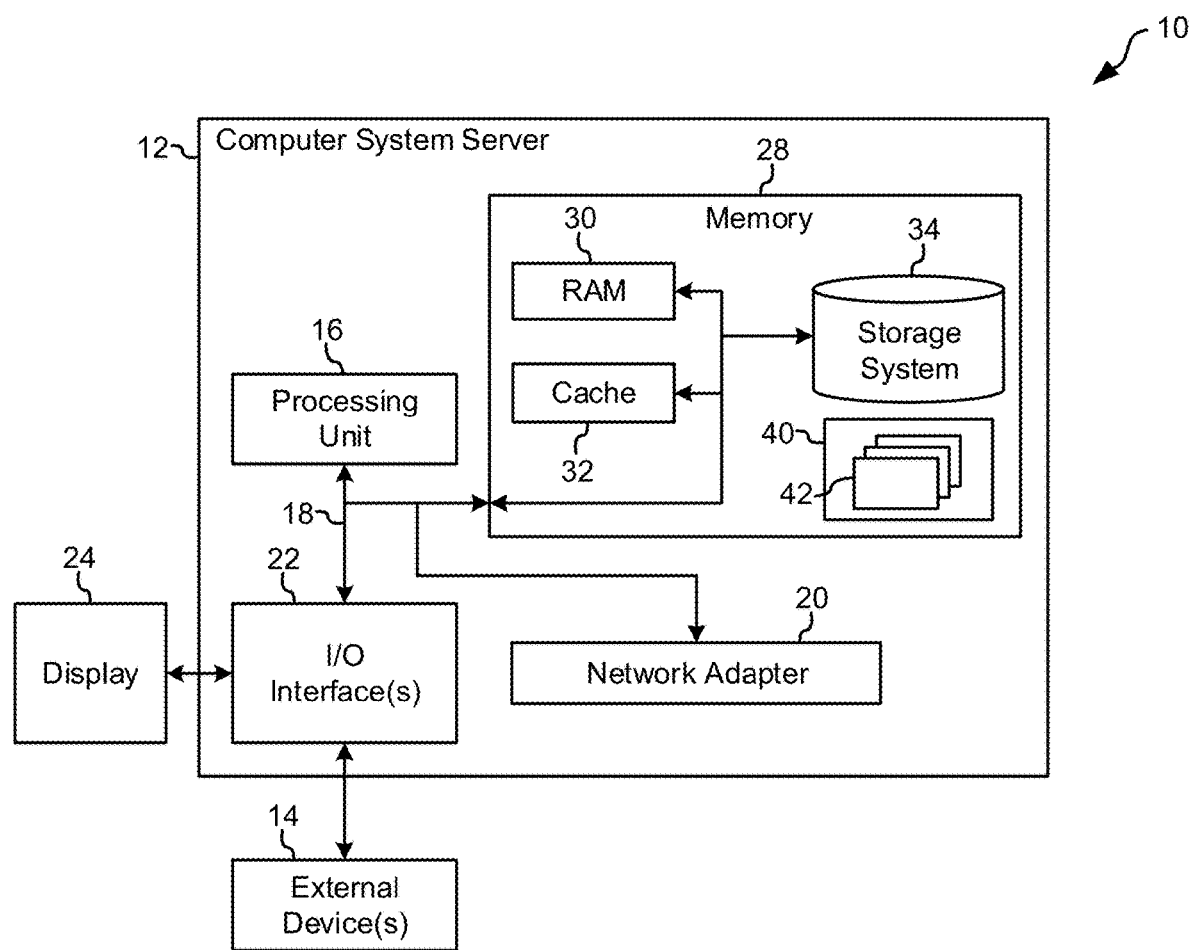
FIG. 1 depicts a cloud computing node according to an embodiment of the present invention.

The following description discloses several preferred embodiments of systems, methods and computer program products for implementing a hot-pluggable file system interface. Various embodiments provide a method for capturing a file access request sent using one or more protocols of a first file system, and redirecting the data access request to a second file system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing a hot-pluggable file system interface.

In one general embodiment, a computer-implemented method includes initiating a file system interface in a kernel space of a system cluster, capturing a data access request sent from a user space of the system cluster, utilizing the file system interface, where the data access request is sent utilizing one or more protocols of a first file system, and redirecting the data access request to a second file system of the system cluster, utilizing the file system interface.

In another general embodiment, a computer program product for implementing a hot-pluggable file system interface includes a computer readable storage medium having program instructions embodied therewith, where the computer readable storage medium is not a transitory signal per se, and where the program instructions are executable by a processor to cause the processor to perform a method comprising initiating, by the processor, a file system interface in a kernel space of a system cluster, capturing, by the processor, a data access request sent from a user space of the system cluster, utilizing the file system interface, where the data access request is sent utilizing one or more protocols of a first file system, and redirecting, by the processor, the data access request to a second file system of the system cluster, utilizing the file system interface.

In another general embodiment, a system includes a processor, and logic integrated with the processor, executable by the processor, or integrated with and executable by the processor, where the logic is configured to initiate a file system interface in a kernel space of a system cluster, capture a data access request sent from a user space of the system cluster, utilizing the file system interface, where the data access request is sent utilizing one or more protocols of a first file system, and redirect the data access request to a second file system of the system cluster, utilizing the file system interface.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
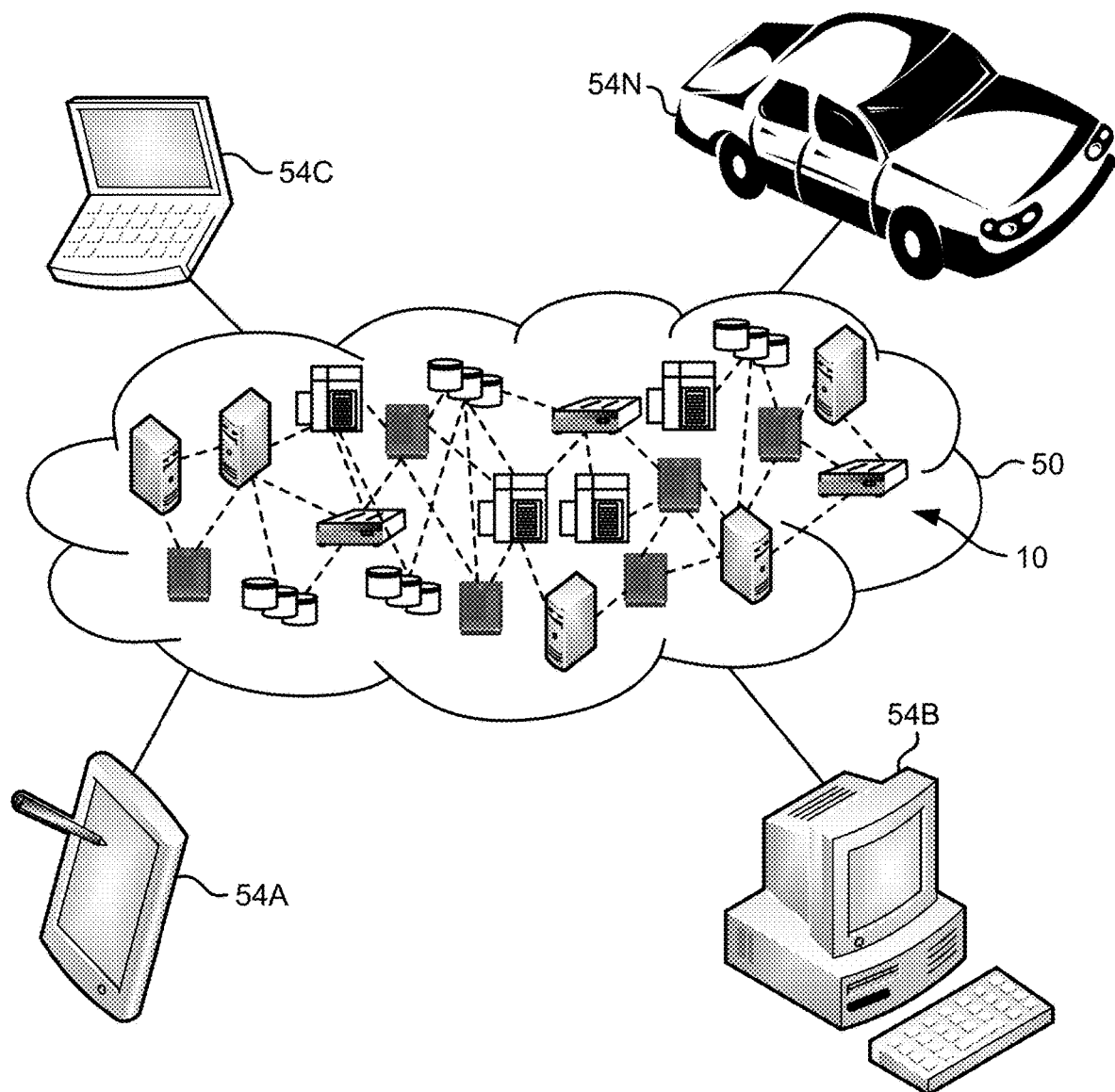
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
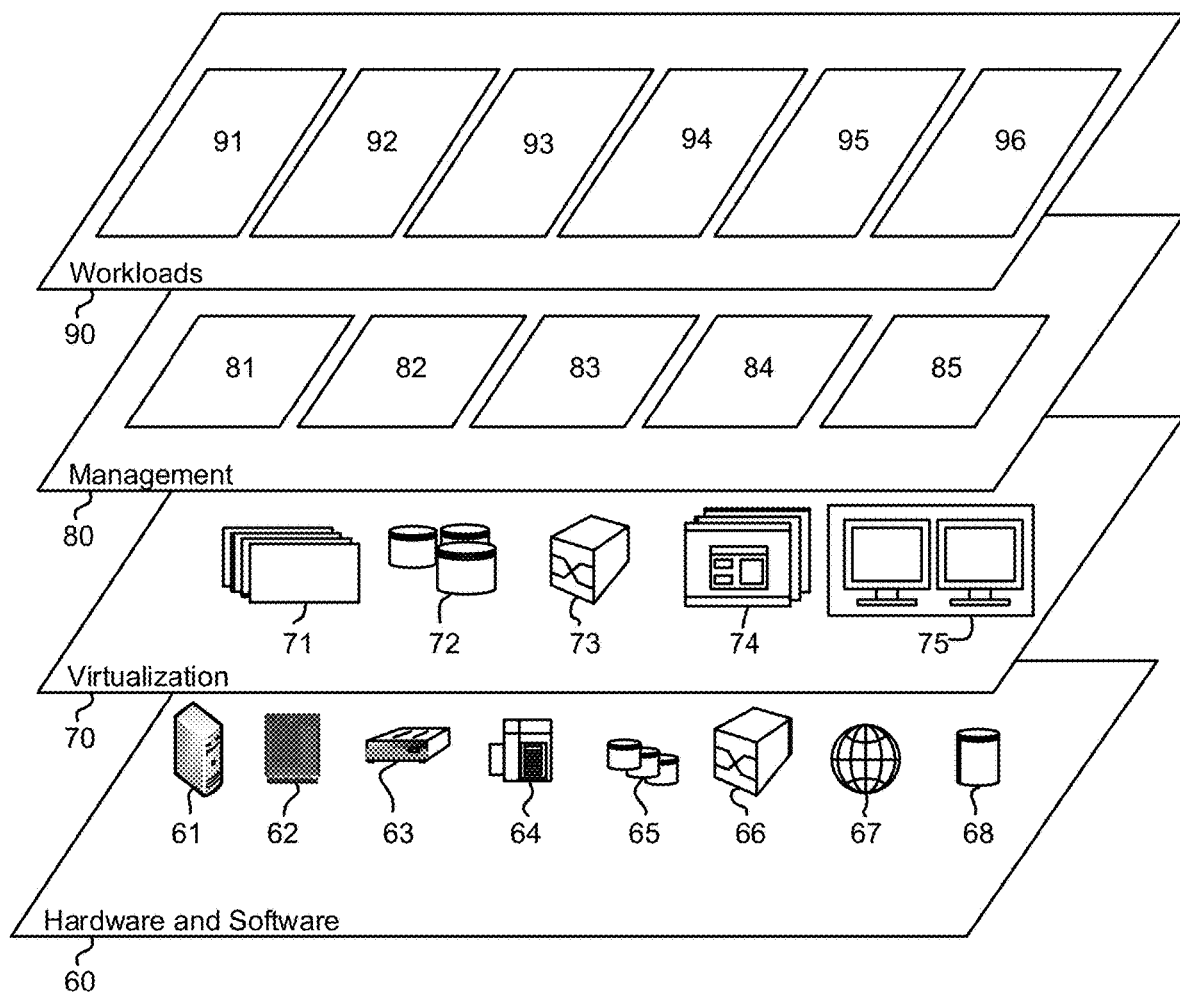
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
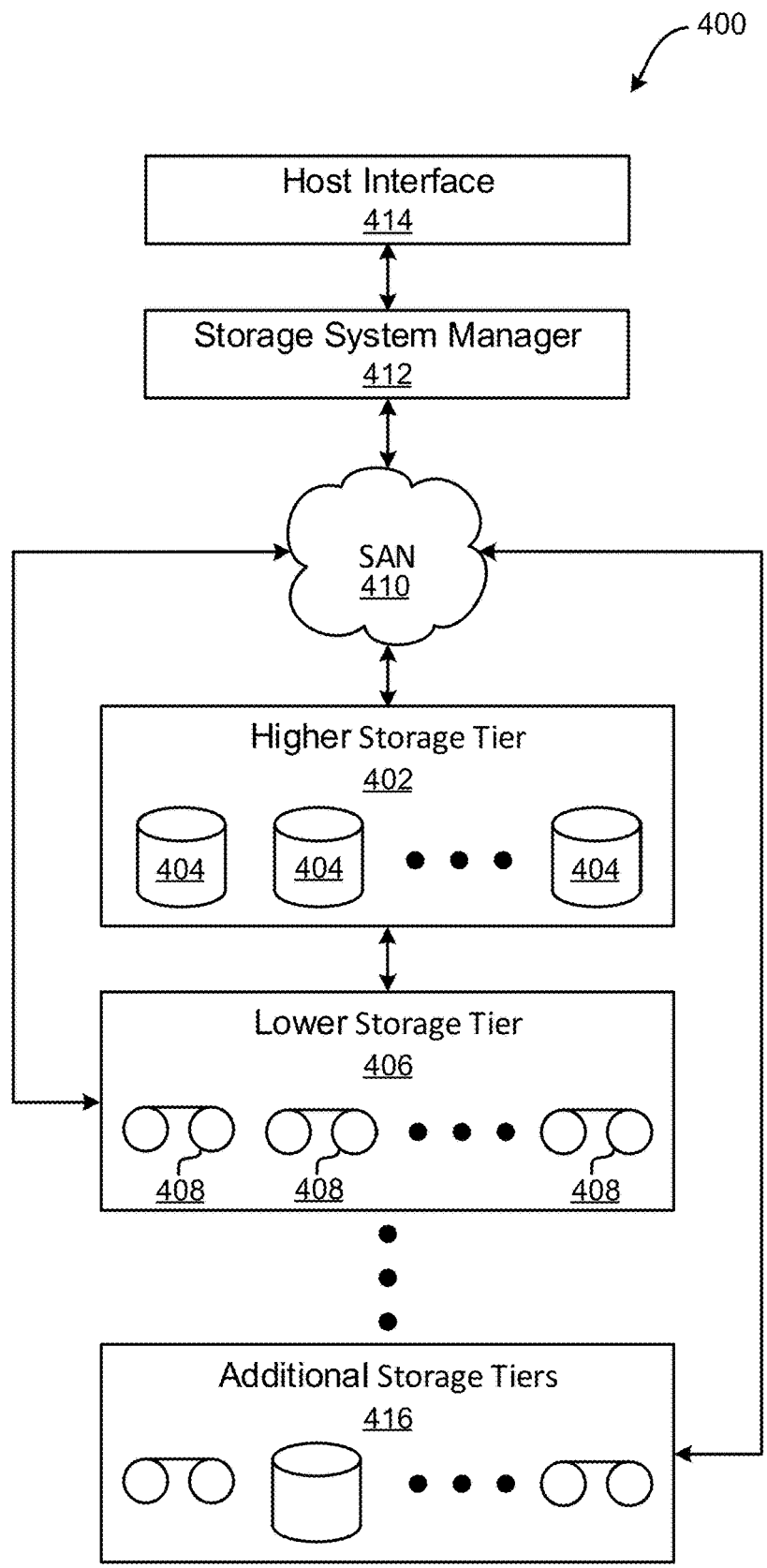
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
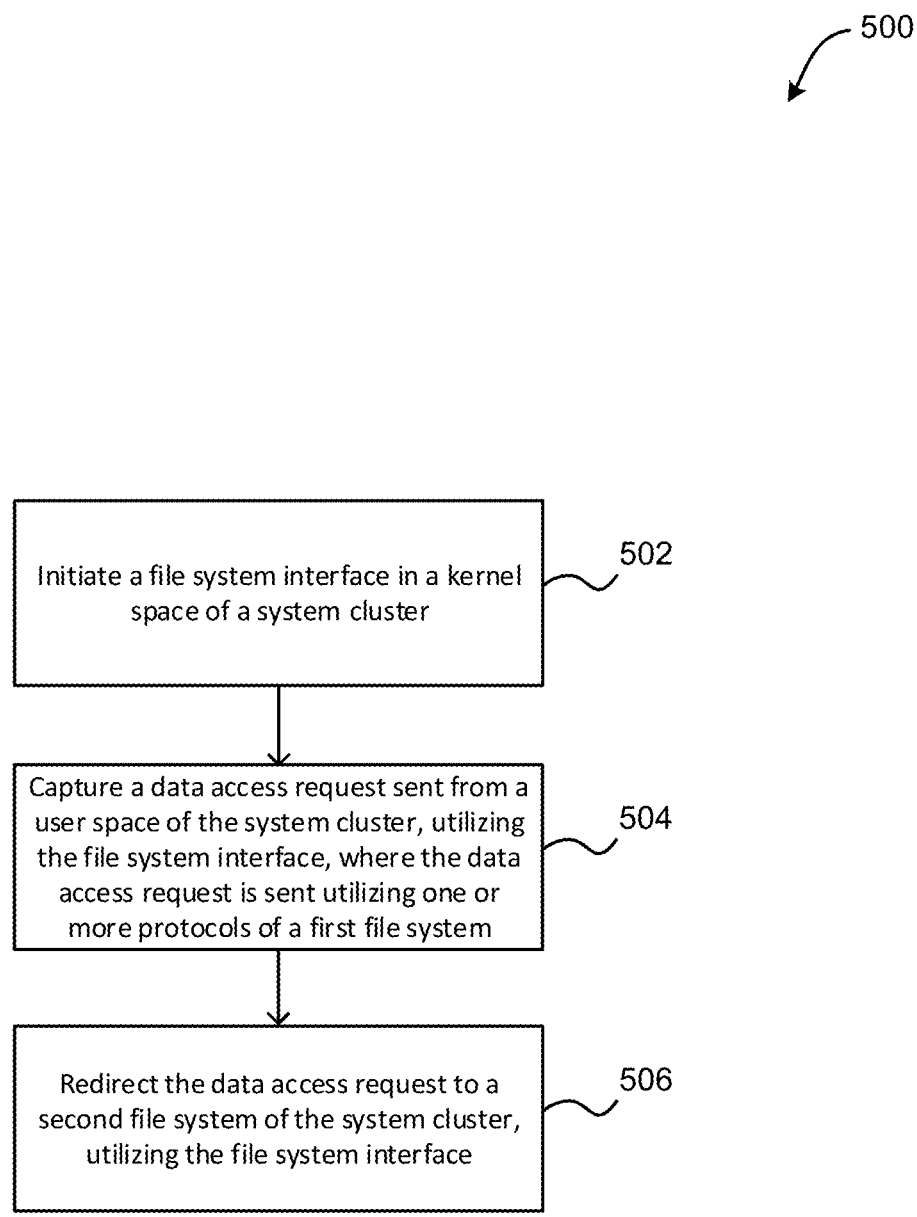
FIG. 5 illustrates a flowchart of a method for implementing a hot-pluggable file system interface, in accordance with one embodiment.

Now referring to FIG. 5, a flowchart of a method 500 is shown according to one embodiment. The method 500 may be performed in accordance with the present invention in any of the environments depicted in FIGS. 1-4 and 6-8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a file system interface is initiated in a kernel space of a system cluster. In one embodiment, the system cluster may include a cluster of nodes. For example, each node may include a computing device (e.g., a server, computer, etc.) that contributes resources such as data storage, processing, etc. to the system cluster. In another embodiment, the system cluster may be implemented within a cloud computing environment. In yet another embodiment, the system cluster may include a distributed data store, where each node in the cluster contributes storage resources to the cluster. In still another embodiment, the kernel space may include a portion of virtual memory within each node of the system cluster that is reserved for use by an operating system. For example, the file system interface may be initiated within the kernel space of a node within the system cluster.

Additionally, in one embodiment, the file system interface may include a hot pluggable file system interface (HPFSI). In another embodiment, the kernel space may include a kernel VFS layer of the node of the system cluster. In yet another embodiment, the file system interface may include an extended VFS layer integrated into the kernel VFS layer of a node of the system cluster. In another embodiment, a native file system may be simultaneously mounted on each of the nodes within the cluster, in order to implement a clustered file system.

Further, in one embodiment, the file system interface may be run as a daemon within a virtual file system layer of the system cluster. In another embodiment, the file system interface may be initiated in response to a message from a user space of the system cluster. For example, the user space may include a portion of virtual memory within each node of the system cluster that is reserved for use by one or more applications (e.g., client applications, etc.). In another example, the user space may be located within a first node of the system cluster, and the kernel space may be located within a second node of the system cluster that is different from the first node. In yet another example, the user space and kernel space may both be located within a single node of the system cluster.

Further still, in one embodiment, a signaling module may be implemented via a daemon in a user space of a node of the system cluster. In another embodiment, the signaling module may send an enable message to the file system interface within the kernel space of a node of the system cluster. In yet another embodiment, the file system interface may be initiated in the kernel space of a node in response to receiving the enable message from the signaling module.

Also, method 500 may proceed with operation 504, where a data access request sent from a user space of the system cluster is captured utilizing the file system interface, where the data access request is sent utilizing one or more protocols of a first file system. In one embodiment, the data access request may include a data I/O request. For example, the data access request may include a data read request, a data write request, etc.

In another embodiment, the one or more protocols of the first file system may include one or more remote procedure call (RPC) protocols implemented according to the first file system. For example, the first file system may include HDFS, and the one or more protocols of the first file system may include a NameNode and DataNode implementation. In another example, the one or more protocols of the first file system may be implemented by a daemon of the first file system within the user space of the system cluster.

In addition, in one embodiment, the data access request may be sent from a client application in the user space (e.g., at a node within the system cluster, etc.). In another embodiment, the data access request may be processed (e.g., at the node, etc.) utilizing the one or more protocols of the first file system at the user space of the system cluster. In yet another embodiment, the first file system may include a native file system of a node of the system cluster where the data access request is captured. In another embodiment, the first file system may include a native file system that is simultaneously mounted within each node of the cluster in order to implement a clustered file system.

Furthermore, in one embodiment, the data access request may be captured by the file system interface within the kernel space of the system cluster (e.g., the kernel VFS layer, etc.). In another embodiment, the data access request may be sent from a user space of one node of the system cluster to a kernel space of another node of the system cluster. In yet another embodiment, the data access request may be sent from a user space of one node of the system cluster to a kernel space of the same node of the system cluster.

Further still, method 500 may proceed with operation 506, where the data access request is redirected to a second file system of the system cluster, utilizing the file system interface. In one embodiment, both the first file system and the second file system may be implemented within one or more nodes of the system cluster. In another embodiment, the second file system may be different from the first file system. For example, the first file system may include a Hadoop distributed file system (HDFS), and the second file system may include an IBM Spectrum Scale distributed file system.

Also, in one embodiment, the first file system may include a native file system of a node of the system cluster (e.g., a file system originally implemented within the node, etc.). In another embodiment, the second file system may include a non-native file system of the node of the system cluster (e.g., a file system that was not originally implemented within the node, etc.).

Additionally, in one embodiment, the data access request may be redirected according to one or more predetermined criteria. For example, the criteria may include a pre-set preference for the second file system. For instance, a preference for use of the second file system may be set at the file system interface. In another example, the criteria may include a speed at which data may be retrieved from data storage implemented utilizing the first and second file systems. In yet another example, the criteria may include one or more available actions that may be performed on the data when the data is stored utilizing the first and second file systems. For instance, the data access request may be redirected to the second file system in response to a determination that more actions may be performed on the data via the second file system than can be performed via the first file system.

Furthermore, in one embodiment, the data access request may be implemented, utilizing the second file system. For example, one or more data blocks may be read or written to within one or more nodes of the system cluster, utilizing the second file system. In another embodiment, the data access request may be redirected directly to the second file system, and implemented utilizing the second file system, within the kernel space of the system cluster, without re-writing the data access request and re-sending it to the user space of the system cluster.

More specifically, instead of intercepting the data access request, rewriting the data access request in kernel space, and sending the rewritten request to user space for a daemon of the second file system to send back to kernel space, the file system interface may redirect the data access request directly to the second file system in the kernel space upon initial capture.

In this way, a plurality of mixed file systems may be implemented within a system cluster, without changing existing protocols used in a user space by the native file system. This may eliminate a need for custom user space protocols for implementing different file systems, and may eliminate a need for additional translation I/O data calls to be performed between the user space and kernel space, which may reduce an amount of data calls, processing, and storage performed by one or more nodes of the system cluster. This may in turn improve a performance of the one or more nodes of the system cluster.

Further still, in one embodiment, the file system interface may be disabled in response to a message from the user space of the system cluster. For example, a signaling module within the user space may send a disable message to the file system interface within the kernel space of the system cluster. In another example, the file system interface may be disabled in the kernel space of the node in response to receiving the disable message from the signaling module.

Also, in one example, after the file system interface is disabled, a second data access request may be sent from the user space of the system cluster, where the data access request is sent utilizing one or more protocols of the first file system. In another example, the data access request may be sent directly to the first file system. In this way, the file system interface may be hot pluggable, and may be added and removed as desired within the system cluster.

In addition, in one embodiment, the file system interface may avoid data replication within the system cluster. For example, the one or more protocols of the first file system may implement a first data replication in user space, and the second file system may implement a second data replication in kernel space. In another example, the file system interface may retrieve from the user space a replication value associated with the one or more protocols of the first file system used to send the data access request.

For instance, the replication value may be retrieved from the node of the system cluster that sent the request. In another example, the replication value may be sent from user space to kernel space within the system cluster. In yet another example, the replication value may indicate an amount of replication (if any) performed in user space by the node.

Furthermore, in one embodiment, the file system interface may override the second data replication performed by the second file system in kernel space in response to determining that the first data replication is being implemented in user space. In another embodiment, the file system interface may adjust (e.g., reduce, etc.) the replication value in response to determining that the first data replication is being implemented in user space. In yet another embodiment, the file system interface may implement the second data replication in kernel space in response to determining that no first data replication is being implemented in user space.

In this way, unnecessary data replication may be avoided within the system cluster. This may reduce an amount of I/O commands sent within the system cluster, and may reduce an amount of stored data within one or more nodes of the system cluster, which may improve a performance of one or more nodes of the system cluster.

Further still, in one embodiment, the file system interface may preserve data locality within the system cluster. For example, if the data access request includes a write, the file system interface may write the data locally to the receiving node, utilizing the second file system. In another example, if the data access request includes a write, the file system interface may write the data across a plurality of nodes within the system cluster, utilizing the second file system.

Also, in one embodiment, the data may be written according to one or more predetermined parameters associated with the data to which access is requested that are implemented via the second file system. For example, the parameters may indicate a desired data configuration, a type of one or more storage pools to be used to store the data, etc. In this way, data locality may be preserved within the system cluster, utilizing the second file system.

Figure 6:
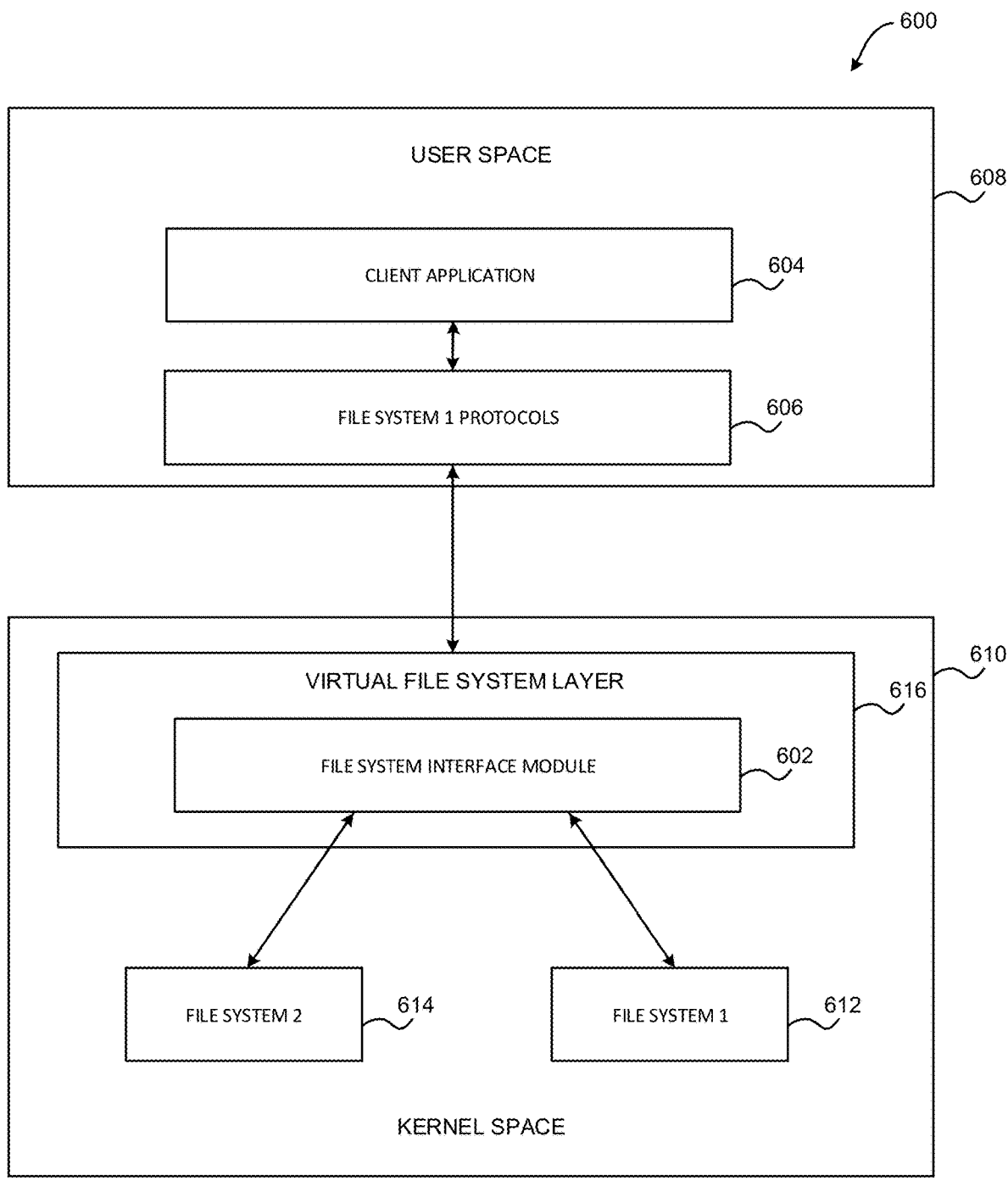
FIG. 6 illustrates an exemplary data flow within a system cluster implementing a file system interface module, in accordance with one embodiment.

FIG. 6 illustrates an exemplary data flow 600 within a system cluster implementing a file system interface module 602, according to one embodiment. As shown, in one embodiment, within a user space 608 of a system cluster, a client application 604 may send a file write request to a plurality of protocols 606 associated with a first file system 612. In one embodiment, the client application may include an application running on a node of the system cluster. In another embodiment, the plurality of protocols 606 may include functionality implemented by a daemon within the user space that initiates the file write request and sends the request to a kernel space 610 of the system cluster, according to the first file system 612.

For example, the plurality of protocols 606 may include an HDFS name node that identifies one or more block locations within data storage where the file write is to be performed. Additionally, the plurality of protocols 606 may include an HDFS data node that makes a call to perform the file write request to the first file system 612 within the kernel space 610 of the system cluster. Further, the plurality of protocols 606 may include protocols used by the first file system 612.

Additionally, in one embodiment, the file system interface module 602 may capture (e.g., intercept, etc.) the call from the plurality of protocols 606 to the first file system 612 within a virtual file system layer 616 of the kernel space 610 of the system cluster. In another embodiment, the file system interface module 602 may redirect the call to a second file system 614 instead of the first file system 612 within the kernel space 610 of the system cluster. The file write request may then be received and completed within one or more nodes of the system cluster, utilizing the second file system 614.

Further, in one embodiment, after the file write request has been implemented, the file system interface module 602 may be disabled (e.g., in response to a message sent from the user space 608, etc.). In another embodiment, the client application 604 may send a second file write request to the plurality of protocols 606 associated with the first file system 612. The plurality of protocols 606 may identify one or more block locations within data storage where the second file write is to be performed, and may make a call to perform the second file write request to the first file system 612 within the kernel space 610 of the system cluster. Since the file system interface module 602 is disabled, the second file write request may then be directly received and completed utilizing the first file system 612.

In this way, both the first file system 612 and the second file system 614 may be implemented within the system cluster. Additionally, the second file system 614 may be selected for use within the kernel space 610 without altering the user space (specifically, the plurality of protocols 606 associated with the first file system 612) for use with the second file system 614.

Figure 7:
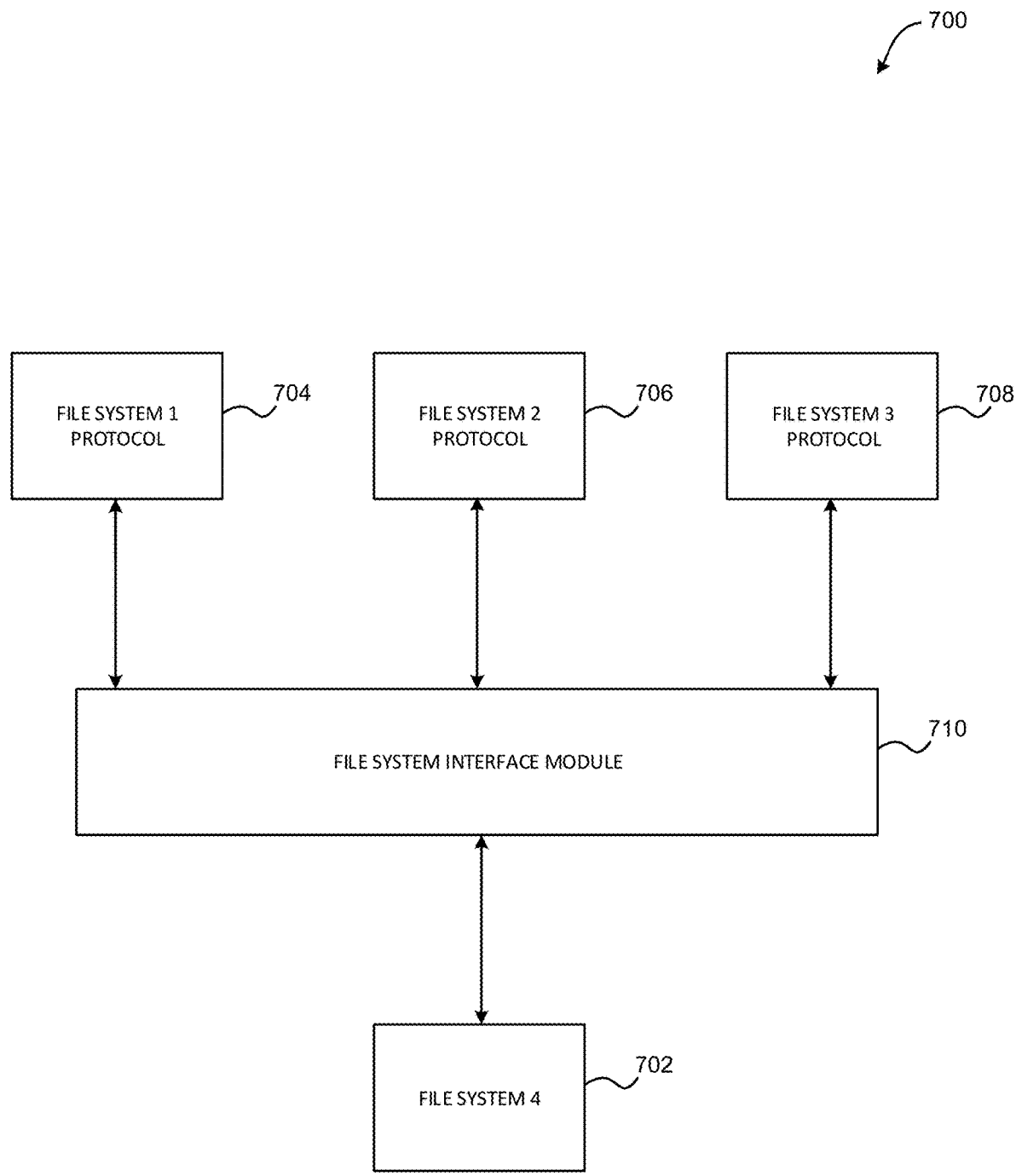
FIG. 7 illustrates an exemplary integration of a file system utilizing a file system interface module, in accordance with one embodiment.

FIG. 7 illustrates an exemplary integration 700 of a file system 702 utilizing a file system interface module 710, in accordance with one exemplary embodiment. In one embodiment, access requests may be sent from a user space to a kernel space, utilizing a plurality of different file system protocols 704-708. For example, client applications within a user space of one or more sending nodes within a system cluster may send data access requests to a kernel space of a receiving node (e.g., the same or another node within the system cluster, etc.), utilizing a plurality of different file system protocols 704-708.

Additionally, in one embodiment, a file system interface module 710 implemented within the kernel space of the receiving node may capture these data access requests, and may redirect them to a file system 702 different from the file systems matching the different file system protocols 704-708. In this way, the file system 702 may be implemented in the kernel space of the receiving node, without altering the different file system protocols 704-708 in the user space of the sending node.

Figure 8:
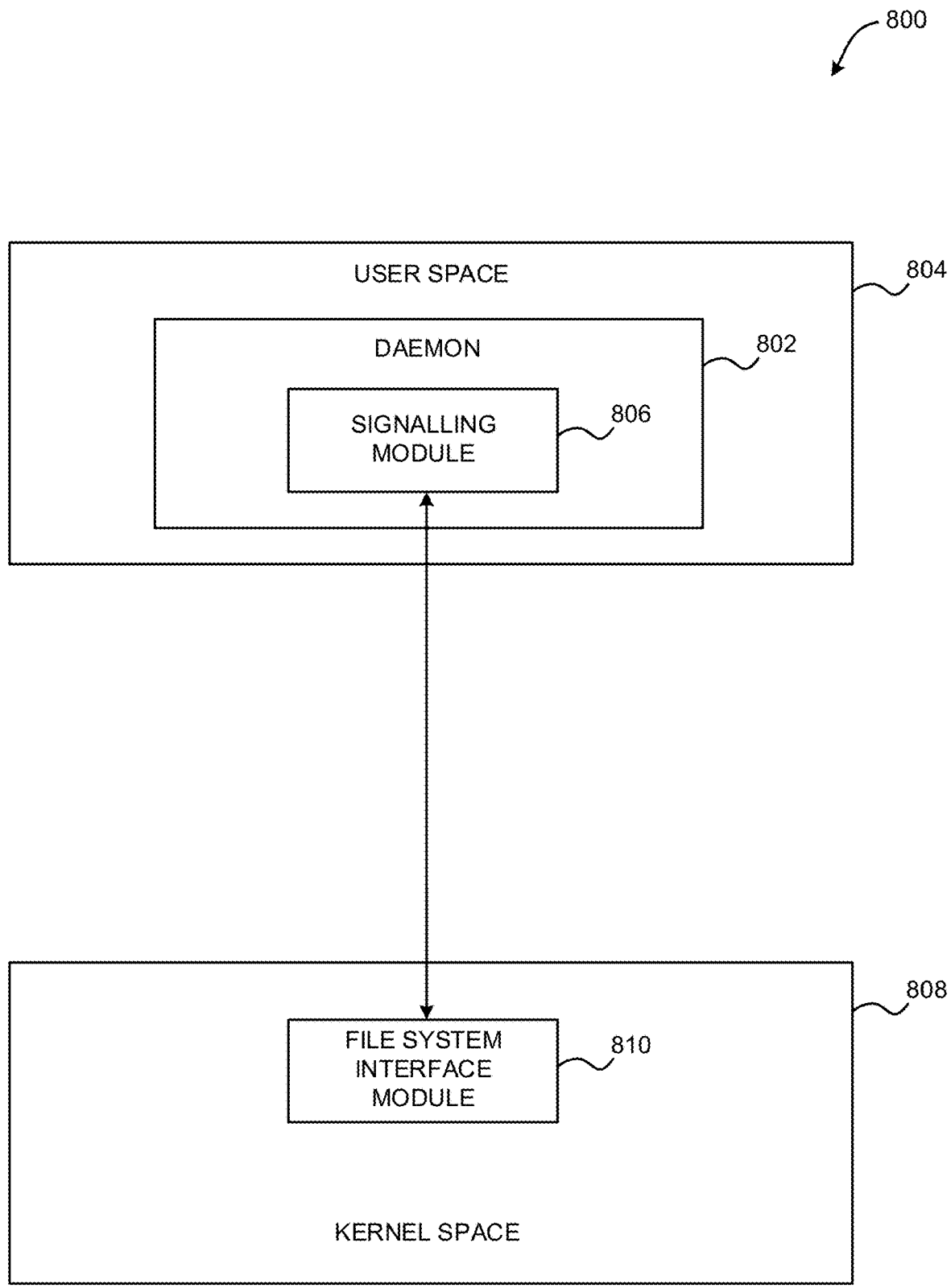
FIG. 8 illustrates an implementation of a signaling mechanism, in accordance with one embodiment.

FIG. 8 illustrates the implementation of a signaling mechanism 800, according to one exemplary embodiment. As shown, a daemon 802 implemented in a user space 804 of a node includes a signaling module 806. In response to receiving a request to activate the file system interface module 810 within a kernel space 808 of the node (e.g., from a user or application in the user space 804, etc.), the signaling module 806 may send a notification to a file system interface module 810 within the kernel space 808. Upon receiving the notification, the file system interface module 810 may initiate within the kernel space 808.

Additionally, in one embodiment, in response to receiving a request to deactivate the file system interface module 810 within the kernel space 808 of the node (e.g., from a user or application in the user space 804, etc.), the signaling module 806 may send a second notification to a file system interface module 810 within the kernel space 808. Upon receiving the second notification, the file system interface module 810 may deactivate within the kernel space 808.

In this way, the file system interface module 810 may be hot pluggable within the kernel space 808.

Hot Pluggable File System Interface for Big Data Applications

Overview

In one example, HDFS (Hadoop Distributed File System) is one exemplary native file system storage option in the Hadoop Ecosystem. In another example, IBM Spectrum Scale FPO (File Placement Optimization) may include a separate file system that provides a robust alternative to a native file system and may provide an enterprise class storage solution for native file system distributions.

In another embodiment, all data transmission and meta data operations in a native file system may be performed through remote procedure calls (RPCs) and may be processed by NameNode and DataNode services within a native file system. Advantages of native file system transparency are as follows:

Native file system compliant APIs or shell-interface command

Application client isolation from storage (application client may access newly integrated file system without GPFS client installed)

Improved security management by native file system authentication and encryption Simplified file system monitoring by file system integration Hot Pluggable File System Interface (File System Interface Module)

In one embodiment, the file system interface may include a hot pluggable file system interface that may provide a connector-less interface that does not need a connector to be plugged to any native file system ecosystem such as Hadoop, Spark, Alluxio, etc.

Additionally, in one embodiment, this interface may allow a non-native file system (e.g., a Spectrum Scale filesystem, Hadoop, Spark, Alluxio, etc.) to access data by separating the layer of data storage and data hierarchy. In one embodiment, the interface may include an extended VFS Layer which may provide a mechanism for capturing the I/O from a kernel VFS Layer once the signaling mechanism from the mmfsd is turned on. All the I/O may then be redirected to the desired non-native filesystem.

In another embodiment, this interface may provide a seamless integration to any native big data ecosystem by providing an extended virtual file system layer, which upon enabling may capture I/O directly from the kernel virtual file system layer. This mechanism may provide a connector-less approach for bypassing all the redundant RPC calls and may directly interact with the desired filesystem daemon to read/write data to the spectrum scale file system.

Existing architecture may make a plurality of redundant RPC calls, which may decrease the performance of the system. Too much caching in namenode and comparisons to a native file system namenode may cause a bottleneck, and there is one additional kernel space to user space translation and reverse translation back to kernel space.

In one embodiment, the file system interface module signaling and capturing mechanism may allow for the real-time integration and disintegration of a first predetermined file system within a separate native file system.

Additionally, in one embodiment, any non-native file system may be plugged in another native file system environment, which may create one or more mixed file system nodes in a cluster. This connector-less architecture may allow one file system to co-exist with a plurality of other filesystems. The file system interface module may allow one file system to integrate and un-integrate from a system cluster.

Further, in one embodiment, the real-time attachment of actual blocks of a file may be implemented, and the metadata may be decoupled from the actual storage subsystem. In another embodiment, the real-time attachment and detachment of a file system may allow hot pluggable functionality (e.g., only mount and unmount may be required, etc.).

Further still, in one embodiment, no specific transparency connector may be required for interaction with applications, and existing RPC calls may be used (e.g., native file system RPC calls such as namenode, datanode, etc.).

Also, in one embodiment, the file system interface module may interact with the VFS layer I/O and may capture the I/O to boost the performance of the cluster. In another embodiment, the file system interface module may be seamlessly integrated with any filesystem present in the node. In yet another embodiment, a kernel module may allow the VFS layer capture of I/O requests. In still another embodiment, file system interface module may be made CAPI (Coherent Accelerator Processor Interface) aware in order to allow any user-level file system direct access to the disks within the node.

In addition, in one embodiment, double replication may be prevented at both a first file system level and a second file system level. For example, the file system interface module may follow a dynamic replication along with the file system interface module mapping mechanism. In another example, the file system interface module may fetch the DFS replication from a native file system (e.g., using Filesystem.getreplication rpcs, etc.). Based on the native file system and GPFS replication value, replica mapping may be done from the native file system to GPFS without doing double replication. The replication may be symmetric and asymmetric as well.

In case native file system replication is allowed, the native file system replicas may be mapped to the GPFS replica blocks. This may be achieved by passing the reference of the gpfs replicas to the pipelined written datanode files.

Further, in one embodiment, data locality may be preserved within the native file system. For example, the file system interface module may write the data locally based on a WriteAffinity depth and Allowwriteaffinity parameters of the data and dataandmetadata storage pool. In another example, file system interface module may maintain the mapping of native file system replicas across a shared storage or shared nothing configuration.

Further still, in one embodiment, the file system interface module may allow reuse of the native file system RPCs. The file system interface module may also harness native file system intelligence with GPFS. In another embodiment, the file system interface module may create a hot-pluggable interface for a separate file system to integrate in a big data ecosystem seamlessly. The file system interface module may also allow dynamic replication to be used and may allow the flexibility to choose which replication will be performed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   initiating a file system interface in a kernel space of a system cluster;
   intercepting, by the file system interface within the kernel space of the system cluster, a data access request sent from a user space of the system cluster to a first file system, where the data access request is sent utilizing one or more protocols of the first file system; and
   directly redirecting the data access request within the kernel space of the system cluster to a second file system of the system cluster that is of a different type than the first file system without re-writing the data access request and without sending the data access request to the first file system, utilizing the file system interface.

2. The computer-implemented method of claim 1, wherein the data access request is redirected according to predetermined criteria, including:
   a speed at which data is retrieved from data storage implemented utilizing the first file system and the second file system, and
   available actions performed on the data when the data is stored utilizing the first file system and the second file system.

3. The computer-implemented method of claim 1, wherein the data access request is redirected to the second file system in response to a determination that more actions will be performed on the data via the second file system than can be performed via the first file system.

4. The computer-implemented method of claim 1, wherein the user space is located within a first node of the system cluster, and the kernel space is located within a second node of the system cluster that is different from the first node.

5. The computer-implemented method of claim 1, wherein the user space and the kernel space are both located within a single node of the system cluster.

6. The computer-implemented method of claim 1, wherein the data access request is processed utilizing the one or more protocols of the first file system at the user space of the system cluster.

7. The computer-implemented method of claim 1, wherein the file system interface is initiated in response to a message from a user space of the system cluster, and the first file system includes a native file system of a node of the system cluster where the data access request is intercepted.

8. The computer-implemented method of claim 1, wherein the file system interface includes a hot pluggable file system interface (HPFSI).

9. The computer-implemented method of claim 1, further comprising:
   disabling the file system interface after directly redirecting the data access request in response to a message from the user space of the system cluster, in response to a disable message from the user space of the system cluster,
   where, after the file system interface is disabled, a second data access request from the user space of the system cluster is sent directly to the first file system of the system cluster without being captured and redirected by the file system interface, in response to the disabling.

10. The computer-implemented method of claim 1, wherein:
    the one or more protocols of the first file system implement a first data replication in the user space of the system cluster,
    the second file system implements a second data replication in the kernel space of the system cluster,
    the file system interface retrieves from the user space of the system cluster a replication value associated with the one or more protocols of the first file system used to send the data access request, and
    the file system interface overrides the second data replication performed by the second file system in the kernel space in response to determining that the first data replication is being implemented in the user space of the system cluster.

11. The computer-implemented method of claim 1, wherein:
    the file system interface retrieves from the user space of the system cluster a replication value associated with the one or more protocols of the first file system used to send the data access request, and
    the file system interface overrides a second data replication performed by the second file system in the kernel space in response to determining that a first data replication is being implemented in the user space of the system cluster.

12. The computer-implemented method of claim 1, wherein:
the first file system includes a native file system of a node of the system cluster that was originally implemented within the node, and
the second file system includes a non-native file system of the node of the system cluster that was not originally implemented within the node.

13. A computer program product for implementing a hot-pluggable file system interface, the computer program product comprising a computer readable storage medium having program instructions embodied therewith, wherein the computer readable storage medium is not a transitory signal per se, the program instructions executable by a processor to cause the processor to perform a method comprising:
initiating, by the processor, a file system interface in a kernel space of a system cluster;
intercepting, by the file system interface within the kernel space of the system cluster utilizing the processor, a data access request sent from a user space of the system cluster to a first file system, where the data access request is sent utilizing one or more protocols of the first file system; and
directly redirecting, by the processor, the data access request within the kernel space of the system cluster to a second file system of the system cluster that is of a different type than the first file system without re-writing the data access request and without sending the data access request to the first file system, utilizing the file system interface.

14. The computer program product of claim 13, wherein the file system interface is run as a daemon within a virtual file system layer of the system cluster.

15. The computer program product of claim 13, wherein the file system interface is initiated in response to a message from a user space of the system cluster.

16. The computer program product of claim 13, wherein the user space is located within a first node of the system cluster, and the kernel space is located within a second node of the system cluster that is different from the first node.

17. The computer program product of claim 13, wherein the user space and the kernel space are both located within a single node of the system cluster.

18. The computer program product of claim 13, wherein the data access request is processed utilizing the one or more protocols of the first file system at the user space of the system cluster.

19. The computer program product of claim 13, wherein the first file system includes a native file system of a node of the system cluster where the data access request is intercepted.

20. A system, comprising:
a processor; and
logic integrated with the processor, executable by the processor, or integrated with and executable by the processor, the logic being configured to:
initiate a file system interface in a kernel space of a system cluster;
intercept, by the file system interface within the kernel space of the system cluster, a data access request sent from a user space of the system cluster to a first file system, where the data access request is sent utilizing one or more protocols of the first file system; and
directly redirect the data access request within the kernel space of the system cluster to a second file system of the system cluster that is of a different type than the first file system without re-writing the data access request and without sending the data access request to the first file system, utilizing the file system interface.

\* \* \* \* \*

UNITED STATES PATENT AND TRADEMARK OFFICE
CERTIFICATE OF CORRECTION

| | |
|---|---|
| PATENT NO. | : 11,036,683 B2 |
| APPLICATION NO. | : 16/031971 |
| DATED | : June 15, 2021 |
| INVENTOR(S) | : Deepak Kumar Jha et al. |

It is certified that error appears in the above-identified patent and that said Letters Patent is hereby corrected as shown below:

On the Title Page

Item (72) Inventors, please replace "Karrthik K. G." with --Karrthik Kalaga Gopalakrishnan--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*